H. S. ROSS.

Improvement in Cocks.

No. 133,120.     Patented Nov. 19, 1872.

Witnesses:
Inventor:

UNITED STATES PATENT OFFICE.

H. SCHUYLER ROSS, OF CHICAGO, ILLINOIS.

IMPROVEMENT IN COCKS.

Specification forming part of Letters Patent No. 133,120, dated November 19, 1872.

*To all whom it may concern:*

Be it known that I, H. SCHUYLER ROSS, of the city of Chicago, county of Cook, and State of Illinois, have invented an Improved Cock, of which the following is a specification:

That which is most desired in a cock under pressure is non-liability to leak; ease, efficiency, and accuracy in operation; prompt and automatic closure after use, with full power of leaving wide open, if desired; together with quick accessibility to all its parts. To effect these I employ a common poppet or check valve, placed at right angles to the axis of the cock, seated in a separate chamber or nozzle, and raised by means of crank or eccentric beneath its lower stem; its seat being of yielding material, which also forms the joint between the cock and the nozzle.

Figure 1:
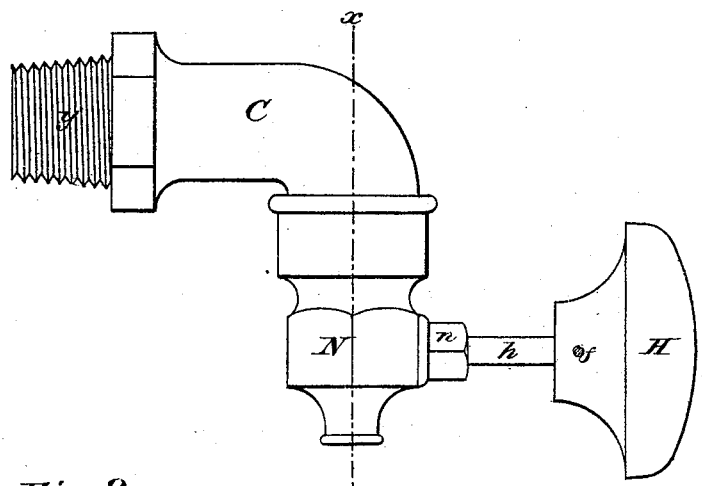
Figure 2:
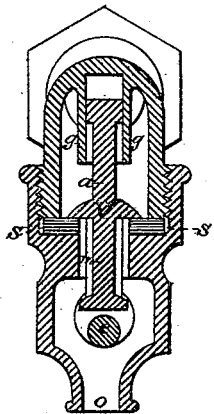
Figure 3:
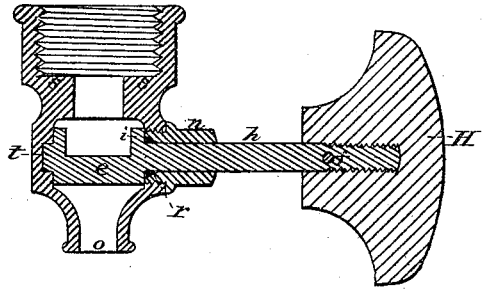

In the accompanying drawing, Figure 1 is a side elevation of a cock embodying my invention; Fig. 2 is a vertical transverse section thereof taken on the plane of the line X X, Fig. 1; and Fig. 3 is a vertical longitudinal section of the nozzle N and its parts.

C is the body or shank of the cock, to be constructed of metal, cylindrical in form, and provided with thread Y to effect attachment to a pipe or vessel, and turned down at opposite end, and provided with thread, on which is screwed the nozzle N, and containing internally a cylindrical guide, $g$ $g'$, for the valve-stem $a$ to move in. N is the nozzle, provided with a female thread, and screwed on the shank C, and containing the packing $p$, seat $s$ $s'$, crank $e$, nut $n$, and discharge $o$. The sides of the seat $s$ $s'$ form the guide for the lower stem of the valve N. This nozzle N should be of the same material as shank C, cylindrical at the top, hexagonal at the center; one of the sides forming a bearing for the nut $n$, and tapered at the bottom to form discharge $o$. The packing $p$ is a flat ring, made of India rubber, lead, or other material suitable for such purpose, and forms a tight joint between the shank C and nozzle N, and at the same time becomes the seat or rest for the valve V. By varying the thickness of this packing the position or angle of the handle $h$ relative to the axis of the cock C can be changed at pleasure. The crank or eccentric $e$ forms a part of the shaft $h$, and is provided with a small cylindrical projection or teat, $t$, bearing in side of nozzle N; also a shoulder, $i$ $i$, against which the packing $r$ bears, driven by the nut $n$, making a tight joint around shaft $h$, accompanied with very little friction. The nut $n$ forms the bearing for shaft $h$, and contains the packing $r$ in tapered recess. It is provided with external thread and shoulder to screw into and bear upon one of the sides of the nozzle N, making close joint. The shaft $h$ is provided with a thread to be screwed into a handle, H, of wood, and secured in position by means of a transverse pin, $f$. V is a valve, resting on packing $p$, and provided with upper and lower stems $a$ and $m$. Stem $a$ is cylindrical, and moves in guide $g$ $g'$. The lower one $m$ is triangular, and moves in the guide $s$ $s'$. The bottom of $m$ is flat and circular, forming a foot, beneath which the crank or eccentric $e$ bears. The valve is closed by gravity and the pressure of the superincumbent fluid.

The cock, on being attached to a pipe or vessel containing fluid under pressure, is quickly filled, and the valve N is pressed closely to its seat, which, being compressible, keeps the same tight. It is easily opened by a light rotary movement of the handle H, which turns crank $e$ until it presses against the base of stem $m$ and raises the valve off its seat, the amount of elevation being perfectly under control, as the vertical movement of crank $e$ is very slow when near its center. The valve instantly closes on releasing the handle. When crank $e$ is at half distance between centers the valve has full opening; but should operator wish the valve to remain open when the handle is released he continues the movement until crank is at its upper center, when valve cannot seat itself by reason of bearing directly over or upon the center of the shaft $h$.

I claim as my invention—

1. The combination of the body C and nozzle N, when the former is provided with an upper guide, $g$ $g'$, and the latter the lower guide $s$ $s'$ for the valve-stem, all constructed substantially as described.

2. In combination with the nozzle N and shaft $h$, the nut $n$, such nut being arranged to operate both as a packing and a bearing for the shaft, substantially as described.

3. The improved cock herein described, consisting of the body C, nozzle N, valve V, guides $g$ $g'$ and $s$ $s'$, nut $n$, shaft $h$, eccentric $e$, and packings $p$ and $r$, substantially as set forth.

H. SCHUYLER ROSS.

Witnesses:
WM. G. HENDERSON,
THOS. JEWELL.